United States Patent
Schenk et al.

(10) Patent No.: US 10,990,708 B2
(45) Date of Patent: Apr. 27, 2021

(54) PERIPHERAL BUS SECURITY INTERFACE AND METHOD

(71) Applicant: DATEX INC., Mississauga (CA)

(72) Inventors: Derek Schenk, Acton (CA); Edward Leavens, Toronto (CA); Abe Schwartz, Markham (CA); Marc Carrafiello, Oakville (CA)

(73) Assignee: DATEX INC.

( * ) Notice: Subject to any disclaimer, the term of this patent is extended or adjusted under 35 U.S.C. 154(b) by 1 day.

(21) Appl. No.: 15/735,409

(22) PCT Filed: Jun. 9, 2015

(86) PCT No.: PCT/CA2015/050526
§ 371 (c)(1),
(2) Date: Dec. 11, 2017

(87) PCT Pub. No.: WO2016/197225
PCT Pub. Date: Dec. 15, 2016

(65) Prior Publication Data
US 2018/0137310 A1 May 17, 2018

(51) Int. Cl.
*G06F 21/00* (2013.01)
*H04L 29/06* (2006.01)
(Continued)

(52) U.S. Cl.
CPC .............. *G06F 21/85* (2013.01); *G06F 13/38* (2013.01); *G06F 21/71* (2013.01); *H04L 2209/16* (2013.01)

(58) Field of Classification Search
CPC .......... G06F 21/85; G06F 13/38; G06F 21/71; H04L 2209/16
See application file for complete search history.

(56) References Cited

U.S. PATENT DOCUMENTS 7,707,348 B2  4/2010  Huotari et al.
7,731,084 B2  6/2010  Redick et al.
(Continued)

FOREIGN PATENT DOCUMENTS

WO  2015157870  10/2015
WO  2015184547  12/2015

OTHER PUBLICATIONS

International Search Report and Written Opinion dated Jan. 11, 2016 in relation to PCT Application No. PCT/CA2015/050526, filed on Jun. 9, 2015.
(Continued)

*Primary Examiner* — Anthony D Brown
*Assistant Examiner* — Rodman Alexander Mahmoudi

(57) ABSTRACT

A security device for securing a peripheral link between a computing device and a peripheral comprising is interposed on the peripheral link, between said computing device and said peripheral. The security device queries an identifier of a peripheral, and imitating said peripheral to said computing device by way of a host port of said security device. Once interposed the security device intercepts data transferred between the computing device and the peripheral device; and obfuscates selected portions of said data intercepted by the security device. Obfuscation may be performed by transferring the data to a tokenizing server, and replacing the data with a corresponding token received from the tokenizing server. The data may be securely stored at the tokenizing server, for later retrieval using the token.

19 Claims, 18 Drawing Sheets

(51) Int. Cl.
    *G06F 21/85*    (2013.01)
    *G06F 13/38*    (2006.01)
    *G06F 21/71*    (2013.01)

(56)                  References Cited

U.S. PATENT DOCUMENTS

| | | | |
|---|---|---|---|
| 8,935,802 B1* | 1/2015 | Mattsson | G06F 21/6245 |
| | | | 726/26 |
| 9,846,878 B2* | 12/2017 | Kumnick | G06Q 20/3674 |
| 2004/0260854 A1 | 12/2004 | Schade | |
| 2009/0249082 A1 | 10/2009 | Mattsson | |
| 2011/0154466 A1 | 6/2011 | Harper et al. | |
| 2012/0278504 A1 | 11/2012 | Ang et al. | |
| 2012/0304273 A1 | 11/2012 | Bailey et al. | |
| 2013/0031629 A1* | 1/2013 | Srivastava | G06F 21/554 |
| | | | 726/22 |
| 2013/0212026 A1 | 8/2013 | Powell et al. | |
| 2014/0181529 A1 | 6/2014 | Joyce, III | |
| 2014/0365372 A1 | 12/2014 | Ross et al. | |

OTHER PUBLICATIONS

Extended European Search Report dated Jan. 3, 2019 in relation to European Patent Application No. 15894525.3, filed on Jun. 9, 2015.
European Office Action dated Mar. 30, 2020 in relation to European Patent Application No. 15894525.3, filed on Jun. 9, 2015.

* cited by examiner

```
connector usb {
    device {
        //Listen for the Card reader to be attached
        vendorId '03£0'
        productId '2724'
        deviceClass 'HID'
    } endpoint {
        //and present it to the host as USB
        enableAccess true
        usb '/dev/gadget/reader-1'
    }
}
```

Device Interface
220

Endpoint Interface
221

FIG. 6

```
//Handle Data coming from the Peripheral Device to the Host
request {
    transform {
        add modifyDeviceId {
        //Modify the device ID as the terminal can't support this card reader
        setVendorId '0d3a'
        setProductId '0500'
        } add secureTrackData {
        //Remove the discretionary data from track 1 & 2 as it may have the CVV, CVC or PIN
        removeDiscretionaryData true
        track '1,2'
        }
    }
}
```

Transformation Rules
121

```
//Process the request
process {
    //Add a tokenize step
    add contentTokenize {
    //Match only to track 1 or 2
        addFilterPredicate trackType { match '1,2'}

//Extract variables and values from the track data
        variable('CustName', field('Name'))
        variable('ExpiryDate', field('Expiration date '))

//Secure the field "Primary account number (PAN) "
        secure field('PAN') {
            //Type of data is a payment card number
            type pan //Apply validations, the return is what will be placed in the field if the validation fails
            validate(type: 'pan-luhn', return: 'SSSS 1111 2222 3333')
            validate(type: 'pan-iin', return: '0000 1111 2222 3333')
            validate(type: 'pan-preauth', return: '9999 0000 1111 2222')
```

Tokenizing Rules
123a

FIG. 7A

```
        //If validations pass, then generate the following values.
        generate(type: 'pan-token', name: 'token', text: 'SS## #### #### ###L')
        generate(type: 'pan-mask', name: 'maskedPan', text: 'SSXX XXXX XXXX SSSS')

//Assign the value "token" that was generated to this field, the rest or available as variables
        assign '${token}'
      }

//If the validations pass then the storeVaultData call is made
      storeVaultData('${token}', 'PAN') {
        //set the status to committed
        status 'commit'

//and define the fields
        field(type: 'secure', name: 'real', value: '${CreditCardNo}', index: 'hash')
        field(type: 'store', name: 'token', value: '${token}')
        field(type: 'store', name: 'masked', value: '${maskedPan}')
        field(type: 'store', name: 'cardholderName', value: '${CustName}', index: 'value')
        field(type: 'store', name: 'expiryDate', value: '${ExpiryDate}')
      }
    }
   }
  }
}
```

FIG. 7B

```
//Handle processing of the Response from the host device to the peripheral device
    response {
        transform {                                    [Transformation Rules 121]
                //No transformations required, however if needed requests can be adjusted to
                //support device translation
        }

//Process the response data that is returned    [De-tokenizing Rules 123b]
        process {
            //If a content tokenize action is active, and no errors occured, then save the vaulted data
            //this persists the data previously added to the vault in request processing
            add saveVaultData {
                addFilterPredicate readSuccess { }
            }
        }
    }
}
```

FIG. 8

PERIPHERAL BUS SECURITY INTERFACE AND METHOD

CROSS-REFERENCE TO RELATED APPLICATION

This application is a national filing of International Application No. PCT/CA2015/050526, filed on Jun. 9, 2015, entitled "PERIPHERAL BUS SECURITY INTERFACE AND METHOD".

TECHNICAL FIELD

This relates to data security and more particularly to computer software and hardware used to secure data transmitted to and from peripheral devices, by way of tokenization.

BACKGROUND

Data security has become critical in modern computing and data transmission. Two known way of securing data are data encryption and tokenization.

Encryption aims to secure data in its place, and tokenization removes the data from the system and replaces it with an alternate (token) value.

Off-the-shelf encryption and tokenization solutions are often not sufficient for use by many organizations.

Peripheral devices such as card readers and flash storage devices are commonly used as inputs and outputs for data, and can be connected using a variety of interfaces such as RS232, USB, FireWire or Thunderbolt.

Existing solutions for providing security for data sent and received to peripheral devices requires installation of software on the client device.

Implementing custom encryption or tokenization, however, often requires significant changes to existing computer systems and software. These changes require development, testing, planning and implementation, which can be expensive and can introduce software bugs. As a result of this risk and cost, many organizations choose not to implement.

Accordingly, methods, software and devices for securing computer data transmitted to and from peripheral devices are desirable.

SUMMARY

Peripheral security devices, methods and software are disclosed.

According to one aspect of the invention, there is provided a security device for securing a peripheral link between a computing device and a peripheral, the security device comprising: a peripheral port for attaching the peripheral to the security device by way of a peripheral bus; a host port for attaching the security device to a peripheral port of the computing device; a network interface communicatively coupling the security device to a computing network; processing logic interconnecting the peripheral port, the host port, and the network interface, the processing logic operable to query an identifier of a peripheral interconnected to the security device by way of the peripheral port, and imitate the peripheral at the host port; and intercept data transferred between the computing device and the peripheral; and obfuscate selected portions of the data intercepted by the security device.

According to another aspect of the invention, there is provided a method of operating a security device for securing a peripheral link between a computing device and a peripheral comprising: interposing the security device on the peripheral link, between the computing device and the peripheral; querying an identifier of a peripheral, and imitating the peripheral to the computing device by way of a host port of the security device; and intercepting data transferred between the computing device and the peripheral device; and obfuscating selected portions of the data intercepted by the security device.

According to yet another aspect of the invention, there is provided a method of operating a security device interconnected between a computer device and a peripheral, the method comprising, at the security device: receiving from the peripheral a plurality of data units carrying data in a message encoded in accordance with an interface layer protocol, the message comprising payload; extracting selected data from the payload, in accordance with one or more tokenizing rules; forwarding the selected data to a token encoder, to allow the token encoder to store the selected data and return at least one token used to identify the selected data; receiving from the token encoder, at least one token; replacing the selecting data in the payload with the at least one token to form modified payload; forming a modified message comprising the payload data; forwarding the modified message to the host device, in place of the message.

According to another aspect of the invention, there is provided a method of operating a interconnected security device comprising, at the security device, the method comprising: intercepting a request message to be exchanged between a peripheral and a host device, the request message comprising request payload data; applying tokenization rules to the request payload data to extract sensitive data from the request message and forward the sensitive data to a token encoder, to allow the token encoder to store the sensitive data and return at least one token used to identify the sensitive data; receiving from the token encoder the at least one token; replacing the sensitive data in the payload of the request message with the at least one token to form modified payload; forming a modified message comprising the payload as modified; providing the modified request message to the host device; receiving from the host device a response message, the response message comprising response payload data; applying de-tokenization rules to payload data of the response message to identify at least one token within the response message; retrieving from the token encoder data stored in association with the at least one token in the response message; replacing the at least one token in the response payload data with the data as retrieved; forming a modified response message comprising the response message payload as modified; providing the modified response message to the peripheral device.

BRIEF DESCRIPTION OF THE DRAWINGS

In the figures which illustrate example embodiments,

FIG. 6 is a listing of pseudo code representing used in protocol analysis/identification at a security device of FIG. 1;

FIGS. 7A-7B are pseudo code illustrating example transformation and tokenization rules in processing a network request between devices of FIG. 1;

FIG. 8 is pseudo code illustrating example transformation and de-tokenization rules in processing a network response between devices of FIG. 1;

DETAILED DESCRIPTION

Figure 1:
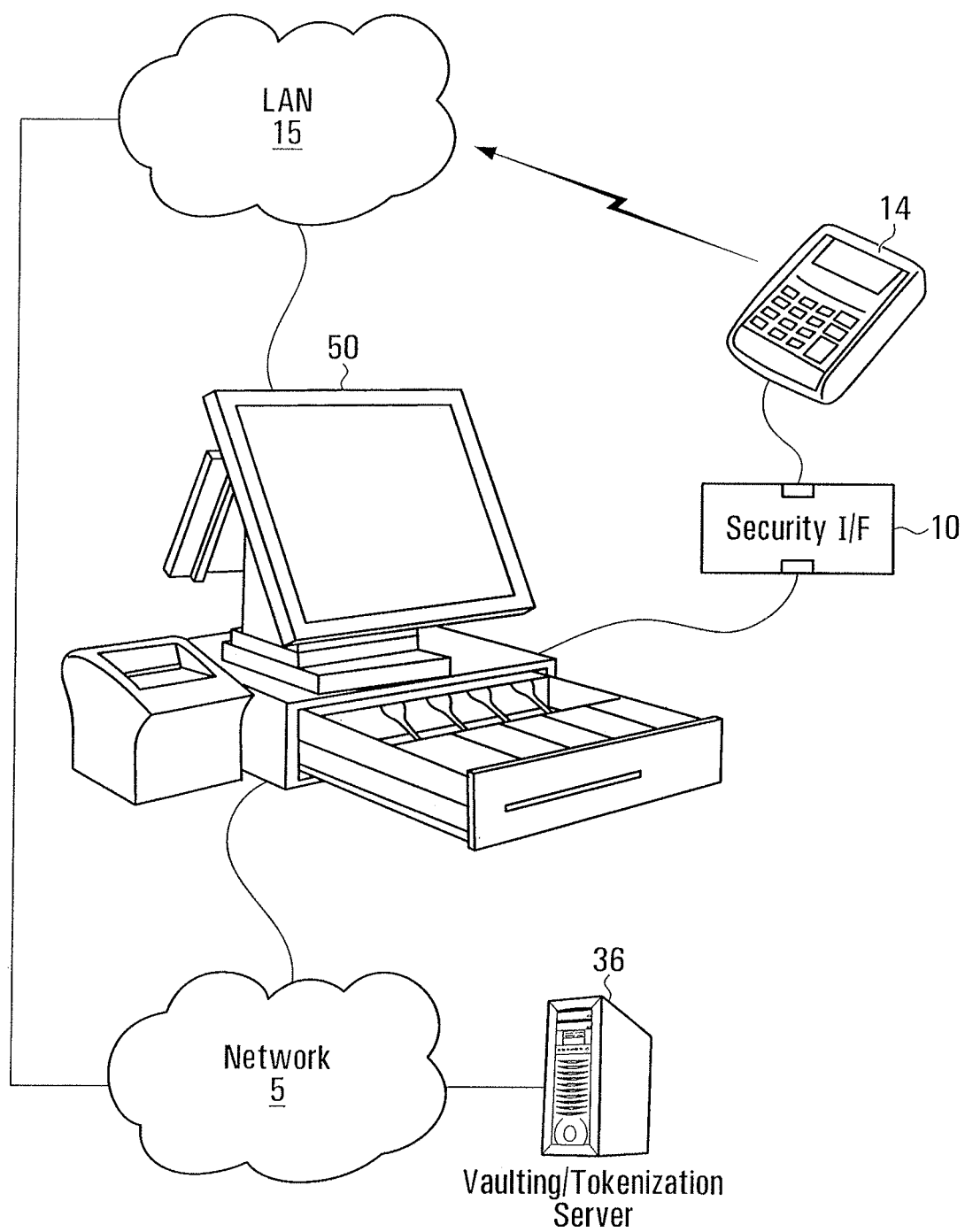
FIG. 1 is a block diagram of a computing device interconnected with a peripheral, by way of security interface, exemplary of an embodiment of the present invention.

FIG. 1 is a block diagram of a computing device 50, interconnected with a peripheral 14, by way of a security interface 10. As illustrated, computing device 50 may be a point-of-sale (POS) terminal; and peripheral 14 may be payment card reader; cheque reader; pin pad or similar peripheral used to collect sensitive data from a user. Security interface 10 may be interposed between computing device 50 and peripheral 14, to limit transfer of sensitive data between computing device 50 and peripheral 14, and to limit storage of such data at computing device 50 and/or peripheral 14.

Peripheral 14 may be any input, output, storage or multi-function device that is capable of communicating for the purposes of sending and/or receiving data, using its own peripheral interface. In a particular embodiment, peripheral 14 may be a payment or identity card reader. In other embodiments, peripheral 14 may be an NFC or RFID reader, keyboard, mouse, human interface device, biometric scanner, touch screen, display screen, printer, computing device, and/or other suitable commercially available auxiliary device. As an example, peripheral 14 may be a magnetic card stripe reader and PIN pad connected to security interface 10. Peripheral 14 may include a USB (Universal Serial Bus) interface and port, for connection to a complementary port of security interface 10 (described below as port 18), or directly to computing device 50. Peripheral 14 may be physically external to computing device 50 or internal thereto (not specifically illustrated).

Computing device 50 and peripheral 14 may be entirely conventional, suited for direct interconnection with each other, for example by USB or similar link, in the absence of security interface 10.

Computing device 50 and security interface 10 may further be in communication with one or more computer networks 5 and network 15. Similarly, Interface 10 may be in communication with network 5 or network 15. Network 5 may be a packet switched data network, and may be any combination of local networks (LANs), wide area networks (WANs), and typically includes the public internet. Network 5 may include wired, fiber optic, wireless and other links. Network 15 may be a local area network interconnecting computing device 50 to other devices locally. Network 5 may, for example, be the public internet, and network 15 may be corporate local area network interconnecting computing device 50 to other similar computing devices, local database servers, accounting servers, and the like.

A data vaulting and tokenization server 36 is further interconnected to computer network 5, as further described below. Data vaulting and tokenization server 36 is geographically removed from computing device 50 and security interface 10 so that sensitive data need not be stored at computing device 50, or even on local area network 15.

Figure 2:
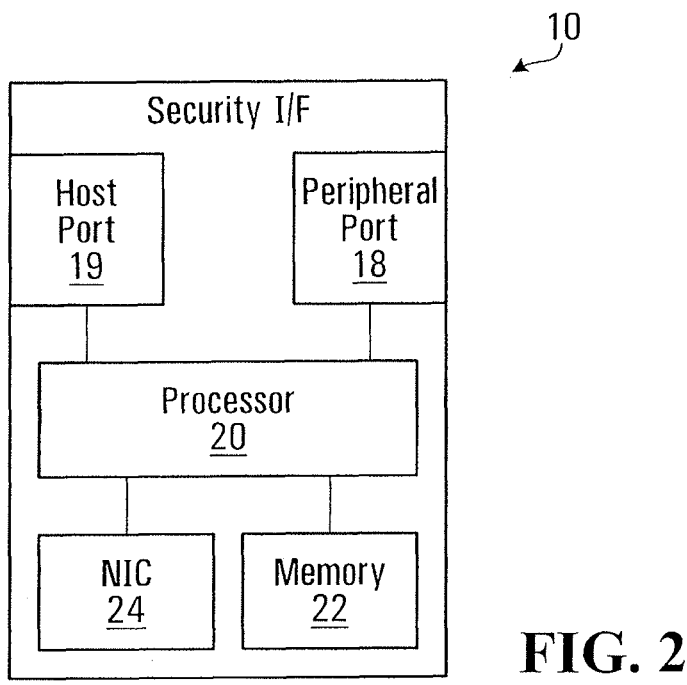
FIG. 2 is a schematic block diagram of the security interface of FIG. 1.

FIG. 2 is a schematic block diagram of security interface 10, exemplary of an embodiment of the present invention As illustrated, security interface 10 includes a peripheral port 18 and a host port 19 in communication with a processor 20. Processor 20 includes or is in communication with processor readable memory 22, storing processor executable instructions (in the form of software, firmware, or the like) causing security interface 10 to function as described herein. Security device 10 further includes a network interface (NIC) 24, for communication with computer network 5.

Peripheral port 18 may be a wired or wireless peripheral input/output interface used to connect peripheral devices for the purposes of communication. Peripheral port 18 may for example be a USB, COM, Serial, Parallel, FireWire, or Thunderbolt port and interface. Peripheral port 18 allows security interface 10 to act as a host to an interconnected peripheral 14. As is conventional, peripheral port 18 may allow the connection of multiple peripherals, by way of a hub (not shown) or otherwise.

Host port 19 may similarly be a wired or wireless peripheral input/output interface used to connect security device 10 to host computing device 50, as a peripheral to computing device 50.

Put another way—security interface 10 may activate and operate port 19 in such a way that it is presented to computing device 50 as a client or peripheral device, and will interact with computing device 50 using the protocols defined by port 19. At the same time security interface 10 may activate and operate port 18 in such a way that it is presented as host to peripheral 14.

Security interface 10 may be conveniently formed as an embedded device hosting operating system software and application software (including suitable libraries) allowing security interface 10 to function as described herein. Security interface 10 may, for example, be an embedded Linux device, hosting and executing the Linux operating system and libraries along with further application software to allow communication over ports 18 and 19, as described herein.

Security interface 10 and data vaulting and tokenization server 36 are coupled by way of network 5, and may communicate as further described herein. Network 5 may optionally use VPN tunnels or other secured connections.

Figure 3:
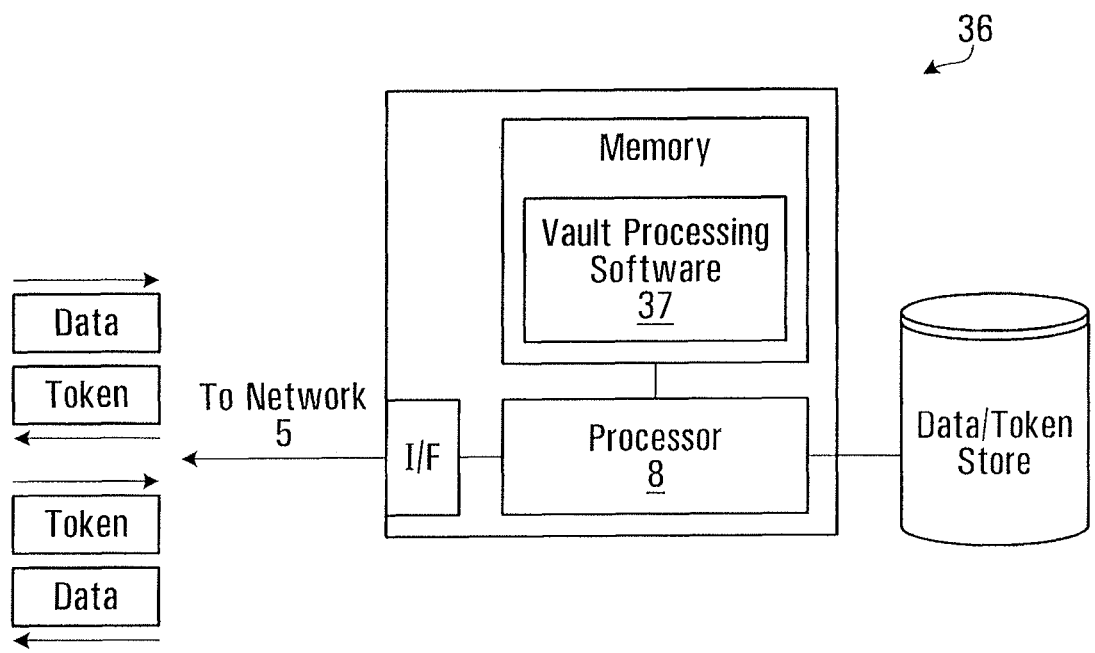
FIG. 3 is a schematic block diagram of a data vaulting and tokenization server of FIG. 1.

Data vaulting and tokenization server 36 is further depicted in FIG. 3 and includes a standard computing core 8—including processor and persistent storage memory—and runs vault processing software 37 stored in memory, which provides data tokenization and data vaulting capability. Vault processing software 37 may include a collection of interfaces to allow the generation of data tokens, and the storage of sensitive data and additional data. As well, vault processing software 37 may be in communication with a data store, that may for example take the form of a database engine, and suitable database stored, to allow for storage of tokens, sensitive data and additional data. The data store allows for the storage and retrieval of data provided to data vaulting and tokenization server 36. Stored data may be encrypted.

In particular, data vaulting and tokenization server 36 may receive sensitive data and optional additional data (including metadata) and store it in association with an arbitrary token identifying the sensitive data and additional data. The token may generated by data vaulting and tokenization server 36 and provided to the provider of the data. Conversely, stored data may be retrieved by providing a token to data vaulting and tokenization server 36 in order to retrieve the stored data associated with the provided token. Vault processing software 37 provides persistent storage of the tokens, the metadata and the secure values, so that the security interface 10, as well as any other device capable and authorized to use data vaulting and tokenization server 36 can access tokens, secure data and meta data.

For example, data vaulting and tokenization server 36 has the ability to generate token values using a named pattern such as payment card (e.g. credit or debit card, loyalty card, or the like), or by using a pattern or string representing the format that the token should follow. For example, data vaulting and tokenization server 36 may accept a request for a unique token given a format string "45##-####-###L-1234" where the returned token will be generated to start with "45", end with "1234", the "#" characters will be replaced with a numeric value, and the "L" will be a value generated such that the new token will pass a Luhn check, and the given returned value is unique across all stored values in data vaulting and tokenization server 36.

Data vaulting and tokenization server 36, in addition to storing the original secured value, has the capability to store additional data in its data store in association with the token, and sensitive data. The additional data may include any value including but not limited to strings, dates, numbers, and masked presentations of the sensitive data. For example, if data vaulting and tokenization server 36 is used to store credit card data, and generated tokens follows a payment card format, then in addition to the original secure credit card number, a masked (or obfuscated) representation of the original card number may be stored where all but the last four (4) digits have been replaced with an 'X'. The additional data may be generated remotely from data vaulting and tokenization server 36, and provided thereto.

Figure 4:
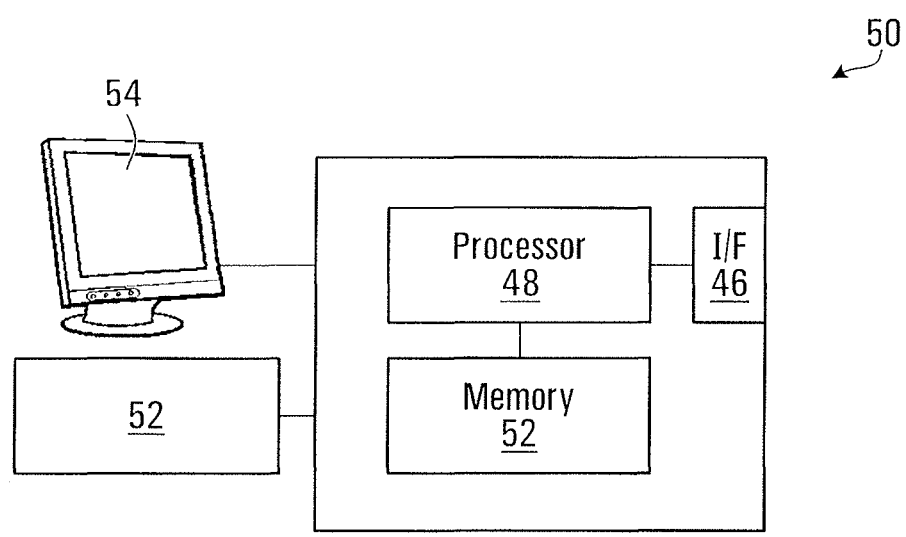
FIG. 4 is a schematic block diagram of a computing device of FIG. 1.

Computing device 50 is further schematically illustrated in FIG. 4. Computing device 50 may be a conventional computing device, acting, for example as a point-of-sale terminal. As such computing device 50, may include a processor 48, display 54, keyboard, network interface 46, and other optional hardware 56—such as a printer, cash drawer, laser scanner, or the like.

Computing device 50 includes persistent computer readable memory 52—including a suitable combination of random access memory, read-only memory, and the like—and one or more network interfaces 46 interconnecting device 50 to network 5 (or another computer network—not shown).

Peripheral 14 may contain suitable hardware and/or software to use port 18 to initiate a connection to an interconnected host. In particular, security interface 10 may use conventional protocols for communication via its peripheral interface to a complementary peripheral interface.

In operation, security interface 10, interconnected between computing device 50 and peripheral 14, accepts connections from peripheral 14 using port 18. Port 18 may listen for and accept connections in a conventional manner as defined by the standards and protocols for port 18, for example the USB standard. Security interface 10, upon receiving a connected peripheral 14 will communicate with device 50 using port 19 simulating the connection of the connected peripheral 14 on device 50. For example, if a USB Mass storage device was connected to port 18 on security interface 10, then the security interface 10 would cause its port 19 to appear as a USB Mass storage device to computing device 50, using the same hardware identification details, such that it would be transparent to computing device 50 that security interface 10 was placed between computing device 50 and peripheral 14.

As will be apparent, a peripheral connection is established before the exchange of data. This connection may or may not include the transmission of data for the purposes of device identification, handshaking, speed negotiation or other purposes required to establish the communication between peripheral 14 and security interface 10, as well as between security interface 10 and computing device 50. Once established the connection may be used to exchange data (in the form of protocol data units). Requests/responses are exchanged over a single or multiple data transmissions. For example, input from a USB magnetic stripe card reader may use the USB protocol to present the card reader as a HID (Human Interface Device) class to transmit the track information read from a card, where the track data is broken into a series of packets as per the USB protocol specification.

Upon identification of a new peripheral device, for example by way of sensing a plug-in event as defined by the USB protocol, the security interface 10 will query the peripheral 14 to determine its information, and will also initialize the peripheral device to allow communication between security interface 10 and peripheral 14.

This initialization will create, on port 18 of security interface 10, a channel that will be used for further communication with peripheral 14. This channel is maintained by security interface 10, with any device information, state and other data required for communication until the removal of said peripheral (i.e. unplugged or powered off). As an example, a process on processor 20 will continually monitor port 18—the USB bus—for new devices through the use of system USB libraries (libUSB). This process could be a callback or a separate thread that performs the scans. This will execute a function to get a connected device list and compare attached devices to the currently channels. When a new peripheral 14 that is supported at interface 10 is found a new channel is created, starting the connection process. The new channel will use the USB libraries to open the device, allowing handshaking to complete.

After connecting the peripheral, the device descriptor information of the peripheral may be retrieved by processor 20, providing details about the attached peripheral, such as the vendor and product id, and the class of device. This information may be used to determine the correct protocol and methods required for communication with the peripheral device.

With the peripheral side of the channel initialized, and proper communication established security interface 10 may create a host channel on host port 19, using, for example, system libraries (GadgetFS), may cause security interface 10 to appear as a slave USB device to an attached host (aka the host channel), such as computing device 50. The host channel to computing device 50 will be initialized using the device descriptor information obtained from the peripheral channel to peripheral 14. At this time the host channel is thus configured to mimic the peripheral device, and security interface 10 hold two channels, the peripheral device channel, and the host channel.

Both the peripheral and host channels allow the sending and retrieval of data, which is abstracted by security interface 10 into an input and output stream per channel. A thread or similar process such as a call back will, upon receipt of data at the input stream from either channel, read the data from said input stream, process it through security interface 10 applying any security services, and then write data to the output stream of the other channel. In this way security interface 10 is able to bridge data between the two channels transparently, moving data packets back and forth, and at the same time, remove or obfuscate sensitive data as described below.

Depending on the peripheral device type and the nature of the modifications made to the stream the security interface 10 may also need to buffer data. For example, if a transmission protocol has specific byte size transmission restrictions and the data stream is being modified to alter the bytes, more or less data transmitted, resulting in buffering to adhere to the protocol standards.

As will be appreciated, binary data is typically provided to port 18 in protocol data units (PDUs)—that may be compliant with one or more suitable interface protocols—e.g. serial packets, over a connection. PDUs received by way of port 18 at security interface 10 are passed to processor 20.

Processor 20, in turn, may under software control decode the PDUs/binary data, apply any desired transformation, and execute any security processing to remove sensitive data from the PDUs and replaced it with substitute data or tokens, as described below. Security interface 10, using processor 20, may buffer some or all of the data received via port 18 where required to perform transformations, or when required to adhere to the protocol specifications of port 19.

For example, if processor 20 is instructed to remove data from a peripheral 14 that is a card reader that matches a credit card pattern, it may buffer input when the start of the pattern is identified until the full pattern is either found or broken, such that computing device 50 does not receive input until the card is either found or confirmed to not be present.

Security interface 10 may further be configured so that the USB device id presented to computing device 50 is different than the one provided by peripheral 14. Such behavior may be desired when computing device 50 requires a specific model of device, and security interface 10 allows the use of a new/different device that performs the same functionality. For example, if needed or desired, security device 10 can alter the device model presented on host port 19. This could be done by modifying a device or vendor id to allow a computing device 50 to communicate with a device that might otherwise be identified as incompatible with device 50. For example if computing device 50 only supports a specific model of card reader that is obsolete, then security interface 10 can make a newer peripheral—e.g. peripheral 14—appear like an older model.

Security interface 10 may operate in such a way that connections from peripheral 14 to computing device 50 pass transparently through security interface 10 to computing device 50, allowing requests and responses to be modified at security interface 10, while allowing connections between peripheral 14 and computing device 50 to appear as direct connections to both peripheral 14 and computing device 50. Routing between device 50 and peripheral 14 may, for example, be accomplished be using two queues at security interface 10. One queue may queue message/packets destined for peripheral port 18, and the other may queue packets destined for host port 19. A running process at security interface 10 may remove messages inbound from peripheral port 18, process them and place them on the queue for host port 19. Inbound messages on host port 19 may be processed in the same way—by transferring them to the queue for peripheral port 18. Each queue can honour protocol conditions (packet size, etc). For USB connections/messages this may be accomplished by way of libUSB methods such as "libusb_bulk_transfer" or "libusb_interrupt_transfer" on both sides of the interface.

Figure 5:
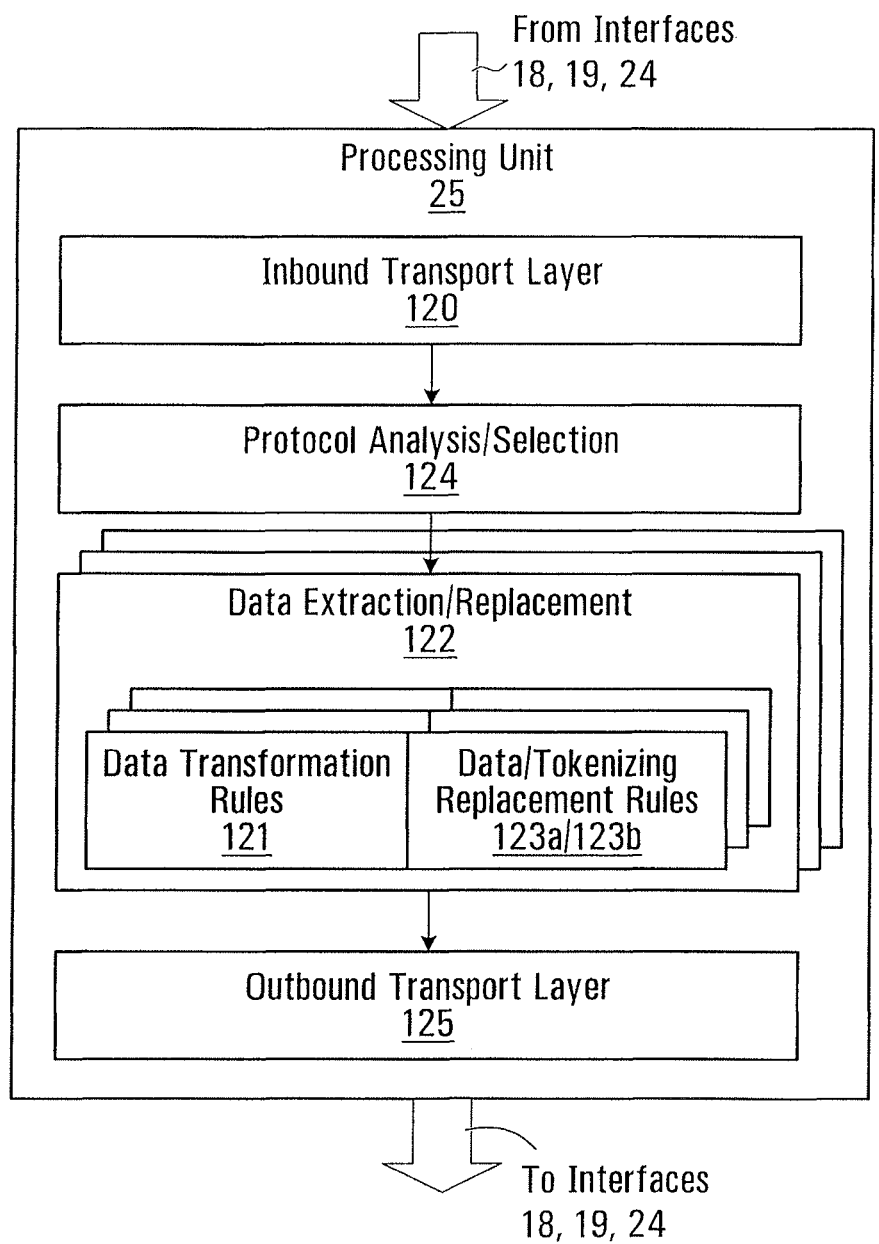
FIG. 5 is a block diagram of software at a security interface of FIG. 1.

FIG. 5 is a functional block diagram of software executed by processor 20 of security interface 10. As noted, security interface 10 may be an embedded Linux or similar device, and may therefore execute a linux kernel and libraries (not illustrated). However, as illustrated, processor 20 executes one or more interface transport layer component 120, 125 (e.g. protocol stacks); a protocol analysis components 124; and one or more data extraction/replacement handlers 122. Each data extraction/replacement handler 122 may further include one or more data transformation rules 121 and one or more data tokenizing rules 123a and data de-tokenizing rules 123b.

Processor 20 operates on connections through security interface 10. Each connection and requests and responses carried over the connection may be individually processed as described herein. Processor 20 may support any number of concurrent connections to provide computing device 50 access to peripheral devices 14, where the maximum number of peripheral devices 14 is limited by the standards and protocols of port 18 and 19.

As will be described in greater detail below, processor 20 of security interface 10 under software control analyzes data units received from computing interface 10, to identify the peripheral 14 and protocols used by it to communicate with computing device 50. The interface layer protocol may for example, be the USB HID (Human Interface Device), USB MSC (Mass Storage Class) or UMS (Universal Mass Storage), Networking over FireWire, Thunderbolt or the like. Other interface communication layer protocols will be known to those of ordinary skill.

Security interface 10 supports a plurality of transport layers through transport layer components 120 and 125. Each transport layer component 120, 125 is a hardware and/or software components that accepts interface connections to/from other peripheral devices—for example on port 18 or port 19, and may include a conventional interface communication stack, or portion thereof, as for example available under the Linux operating system. For example, a connection may be a USB connection transmitting keyboard input using the USB HID serial protocol. Transport layer component 120 will handle the interface connection and the USB commands. Another connection may be an isochronous connection using a Serial Bus Protocol, and transport layer component 120 will handle the iEEE 1394 connection (data extraction handler 122 may decode Serial Bus Protocol details, as detailed below).

Security interface 10 hosts a plurality of decoding/encoding handlers 122, with each decoding/encoding handler 122 designed for a designated interface layer protocol, as identified by protocol analysis component 124. Each decoding/encoding handler 122 is capable of receiving binary data and decoding the data to allow the results can be interpreted in a meaningful way facilitating transformations, modifications, substitutions and other processing of the data, by way of data transformation rules 121, data tokenizing rules 123a and data de-tokenizing rules 123b. Decoding/encoding handler 122 may also be capable of encoding data into a binary representation so that the data can be transmitted using a transport layer component 125, different from the transport layer component 120 on which the data was received.

An example of a data extraction/replacement handler 122 is USB HID input extraction/replacement handler, where this USB Card Reader handler is able to read the binary data from the transport layer component 120, interpret it as magnetic stripe card data and convert it into a data model representation of the magnetic stripe data such that individual elements may be selected from the input, for example a credit card number, name or date, and to allow conversion of the data model representation back into binary format.

Yet another example of a extraction/replacement handler 122 would be a USB Mass Storage handler, where the decoder is capable of converting the binary stream into mass storage file system requests, and then re-encode these objects back into binary format, where the protocol objects support identification, removal and replacement of data with token replacements, where the purpose of such transformations could be to remove sensitive data such as credit cards from file being transferred to the USB storage device.

Individual data transformation rules 121 and data tokenizing/de-tokenizing rules 123a/123b within data extraction/replacement handler 122 may further transform decoded data and tokenize (or de-tokenize) portions of the data. Security interface 10 hosts a plurality of such tokenizing/de-tokenizing rules 123a/123b and data transformation rules 121—that are connection and application layer protocol specific. That is, tokenizing/de-tokenizing rules 123a/123b and data transformation rules 121 may be specific to each connection, and may be programmed by an administrator with knowledge of the interface provided by peripheral 14. Data tokenizing/de-tokenizing rules 123a/123b and data transformation rules 121 may thus be specific to the very data that is being provided from/to peripheral 14. For example, in the case of USB Card Reader connections from peripheral 14, data tokenizing/de-tokenizing rules 123a/123b and data transformation rules 121 may be specific to track data read from a card or similar content provided by peripheral 14.

Each of data tokenizing/de-tokenizing rules 123a/123b and data transformation rules 121 is configured with a plurality of conditions that define when the respective rule should be applied. These conditions may use any details of the results of the decoded data, the transport layer, connection related details, or any other programmatically defined condition capable of being evaluated at processor 25. A transformation rule 121 will, when invoked, alter payload data, returning altered payload data, allowing other transformation rules 121 to be applied, as well as allowing the result to be passed to tokenizing/de-tokenizing rule 123a/123b.

An example of a transformation rule 121 modifies device id information for a peripheral 14, such that the security interface 10 can alter the appearance of the presentation of the peripheral 14 to the computing device 50, where such behavior may be required to allow a newer model or version of a peripheral 14 to be used where the computing device 50 may not yet support that model or version.

Security interface 10 similarly supports a plurality of tokenizing/de-tokenizing rules 123a/123b, where each tokenizing/de-tokenizing rule 123a/123b is capable of processing the result returned from a data transformation rule or tokenizing rule to make a modification to the structure and or content of payload data before it is transmitted to computing device 50 or peripheral 14. Again, each tokenizing/de-tokenizing rule 123a/123b may be configured with a plurality of conditions that define when the rule is to be applied, where these conditions may use any details of the payload data, the transport layer, connection related details, or any other programmatically defined condition that may be evaluated.

An example of a transformation tokenizing rule 123a is a USB Card Reader tokenizing rule, which when invoked with a specific data track and element containing data of certain type—such as, for example a credit card number inside of an magnetic stripe data track—using a rule such as the track and position, and will replace the element with a token substitute value, to form a modified data track that no longer contains the secure data. Yet another example of a tokenizing rule 123a is a Thunderbolt mass storage processor, which when invoked will process buffers of data corresponding to files being read from a device, and will scan for and replace a specific value or in the stream, altering the value from a token substitute value back to the original secured value, where the expected value of the field is a social insurance number, and the storage device has returned a file containing one or more social insurance numbers that are currently represented by substitute tokens.

Example pseudo code depicting protocol analysis/selection 124 is illustrated in FIG. 6. Example, pseudo code for transformation rules 121 and tokenizing/de-tokenizing rule 123a/123b is depicted in FIGS. 7 and 8.

Figure 9A:
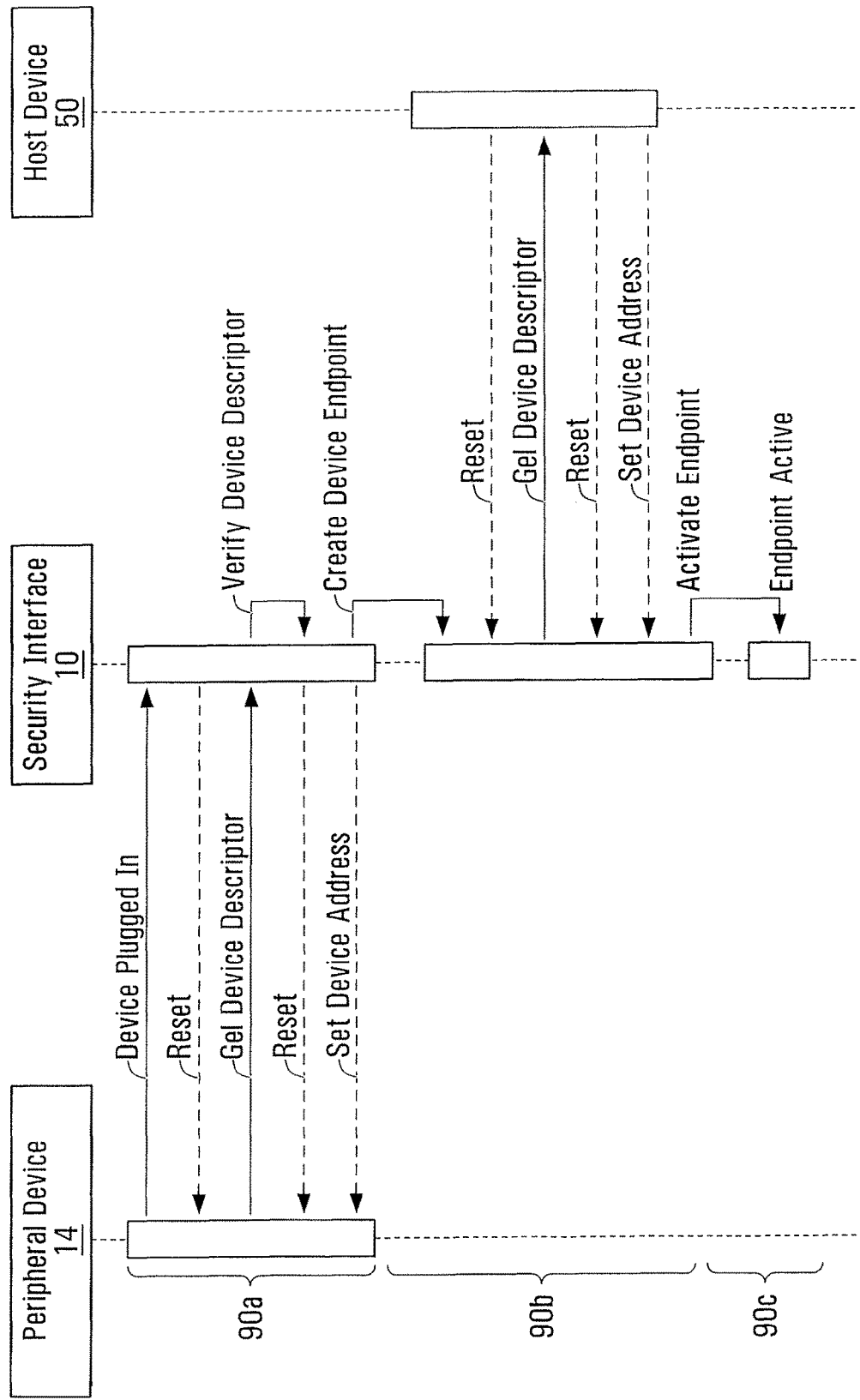
FIGS. 9A-9B are a flow diagram illustrating example connections between host and peripheral device.
Figure 9B:
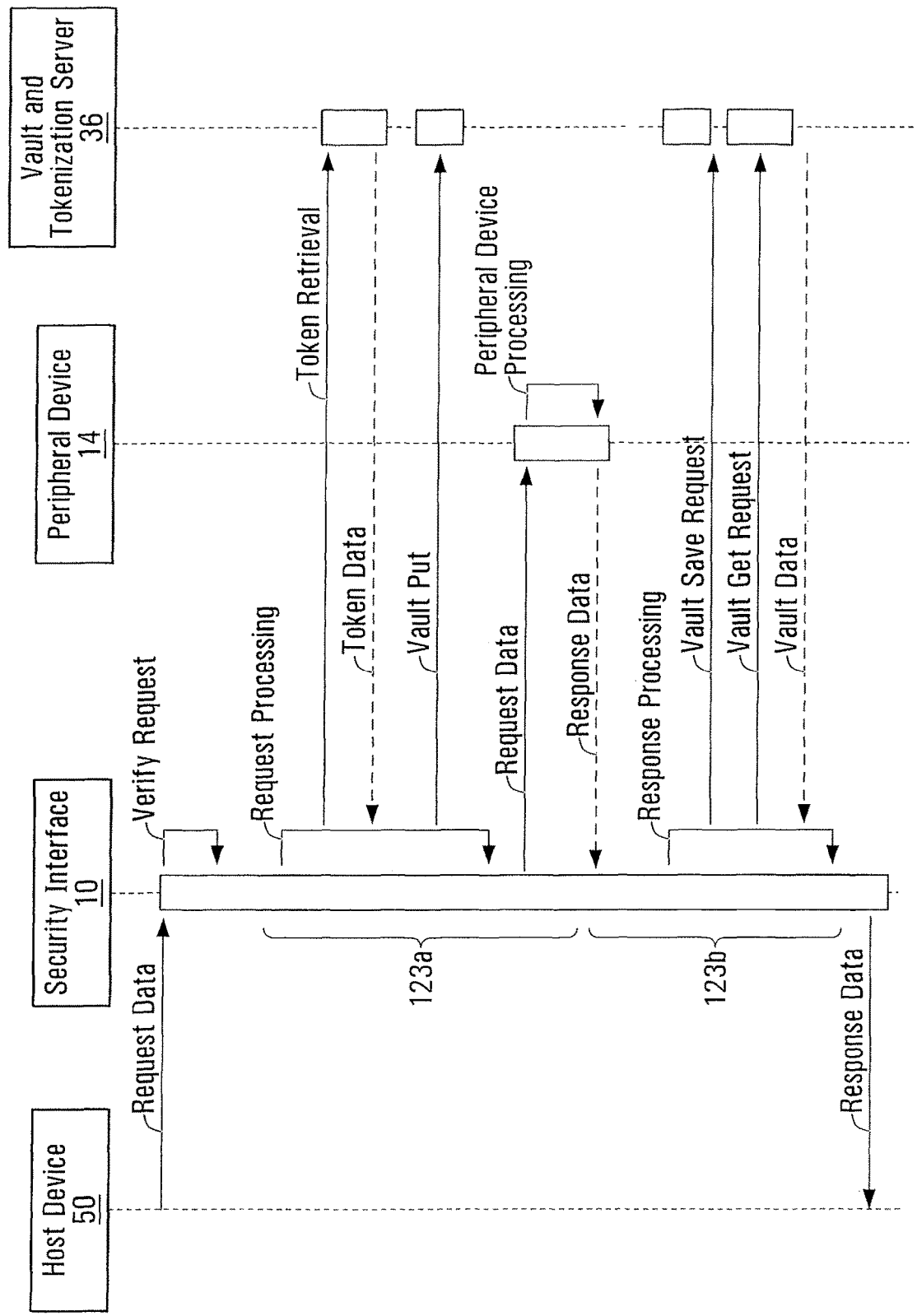

Operation of security interface 10 and interaction with peripheral 14, data vaulting and tokenization server 36 and computing device 50 are detailed in the sequence flow of FIGS. 9A and 9B, and flow charts in FIGS. 10-15.

Peripheral 14 is connected or plugged into security interface 10, which initiates the activation of the endpoint as illustrated by 90a in FIG. 9A. This connection event may be manually initiated, initiated through the power up of a peripheral 14, or a result of a system restart where the peripheral 14 may already be connected or plugged in. The device information is first verified by the transport layer component 120 to ensure that the device is valid, as well as using a set of validation rules that may include other technical restrictions such as hardware identification information or peripheral 14 restrictions. For example, security interface 10 can be configured to only initiate connections for a specific peripheral 14.

Once the peripheral 14 has been verified, processor 20 may create an endpoint as illustrated by 90b in FIG. 9A. The creation of the endpoint by security interface 10 allows a response from the security interface 10, to the computing device 50, for a device descriptor. When the security interface 10 receives a request from computing device 50 for a device descriptor, transport layer component 120 generates a response using the device descriptor provided from the peripheral 14 in 90a. When the security interface 10 completes the setup of the device endpoint the endpoint is made active as shown in 90c and the connection is now established by way of security interface 10, that intercepts PDUs to be transmit over the connection. Typically connections transport one or more requests and responses, where the request may be initiated by computing device 50 or peripheral 14, in accordance with the capabilities and standards of the connection type and protocol. A connection may remain open until closed, time-out, disconnect or any other event or interrupt. Context data may be stored for the duration of the connection, and can include data and state information related to the connection, data or state.

The request will then be processed, including request decoding, transformation and tokenization. This may or may not include token retrieval calls to vaulting and tokenization server 36, as detailed below. Processing of the request may also involve storing data (e.g. context information) in the vaulting and tokenization device 36.

Figure 10:
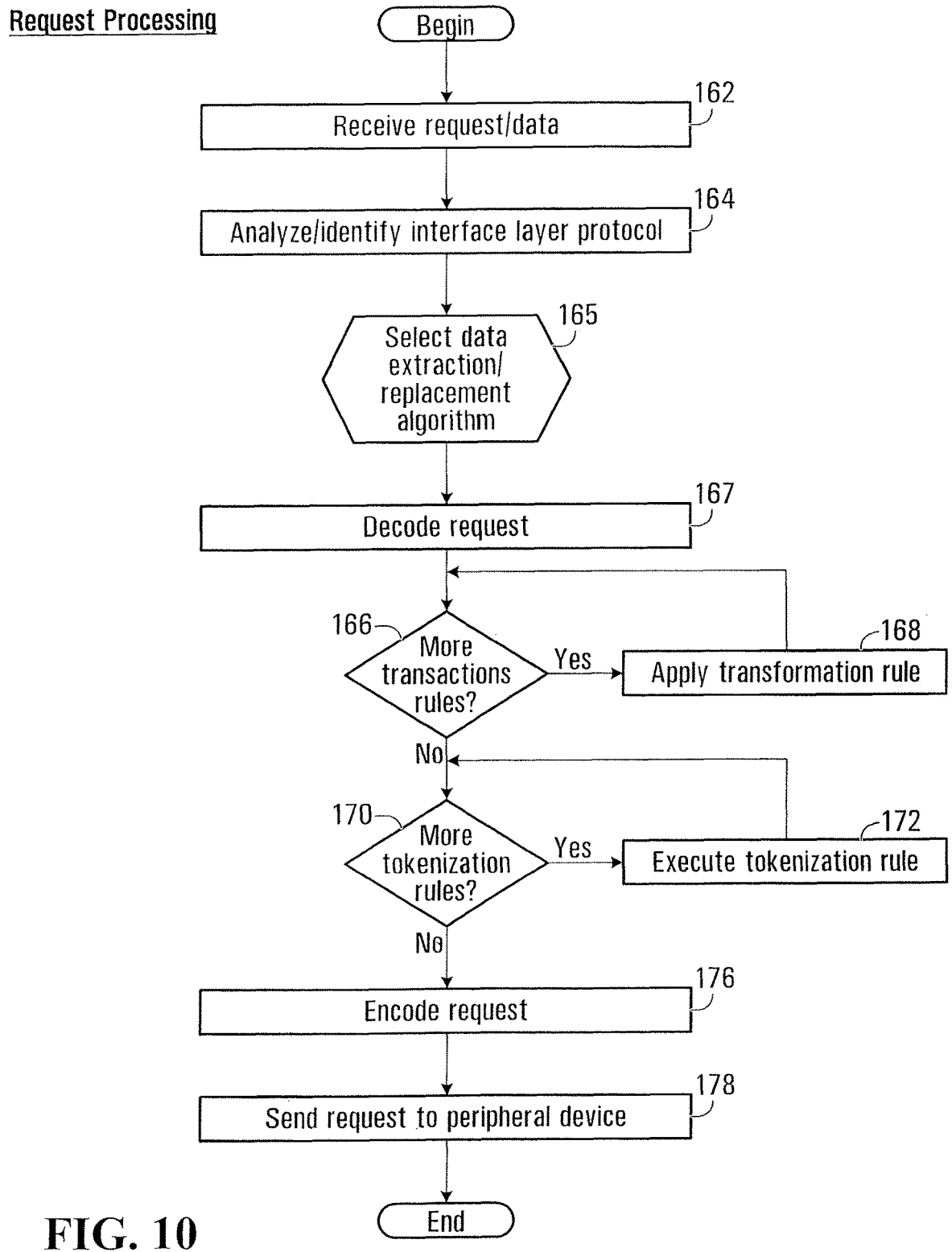
FIG. 10 is a flow chart of the handling of a request at the security device of FIG. 1.

As illustrated in FIG. 9B, a computing device 50 initiates a request for data from the peripheral 14 by initiating a request which is processed at security interface 10 in blocks S161-S178, depicted in FIG. 10. Such data request may be initiated by either the peripheral 14 or the computing device 50, in accordance with the capabilities and standards of the connection type and protocol. For example, a USB 1.0 connection may only allow requests initiated by the computing device 50, however an IEEE 1394 connection may allow the computing device 50 or the peripheral 14 to initiate the request.

As illustrated, the request for a connection and associated PDUs is received in block S162. In block S164 processor 25 executing protocol analysis/selection block 124, identifies the interface layer protocol associated with the request.

In an embodiment, the interface layer protocol may be identified by a specific vendor and device identifier. For example, port 18 of security interface 10 may be configured to respond to and accept connections from a USB peripheral device vendor '0x03f0' and device id '0x2724', and further to verify via the device descriptor that the peripheral 14 is a USB Card Reader of interface type HID (Human Interface Device) class. An associated data extraction algorithm may cause interface 10 to decode and encode HID class communications, specifically processing text input in the form of magnetic stripe data. As another example port 18 may be configured to accept USB MSC (Mass Storage Class) or USB UMS (Universal Mass Storage), for the purposes of processing Serial Bus communications.

FIG. 6 depicts pseudo code 220 used to as part of protocol analysis component 124 to identify a specific interface layer protocol, where the example code 220 identifies a USB HID class connection. As will be appreciated, protocol analysis component 124 may further include code to identify other specific interface layer protocols.

Code 220 defines the connection as using USB, such that all encoding and decoding services will process using the USB protocol. The transport layer is defined by specifying a plurality of device and class instructions defining a vendor, product and device class to allow connections to on port 18. Code 221 further includes a the definition of an endpoint which will be made available to computing device 50 to allow communications.

Once the interface layer protocol has been identified in block S164 (FIG. 8), interface 10 select one of a plurality of data extraction algorithms 122 at interface 10 in block S165 in dependence on the identified application layer protocol.

The selected data extraction algorithm 122 may then decode payload data in the request message in block S167.

For example, if the connection transports an OUT data request from peripheral 14 to computing device 50 to provide magnetic stripe data input, then all of the data may be retrieved in order to support constructing the full magnetic stripe data to facilitate field replacement. In yet another example the connection is a transfer of a binary document to a USB Mass storage device, where the data will be streamed in chunks of a previously defined size to limit memory requirements on the security device, where the binary document does not have any configured transformations or processing.

The decoded data may then be transformed by data transformation rules 121 in blocks S166 and S168, and tokenizing rules 123a in blocks S170 and S172.

More particularly, each of the transformation rules 121 may be sequentially applied to the payload of the message in blocks S166 and S168. The results of one transformation rule 121 may thus be passed to the next transformation rule 121, so that multiple transformation rules 121 have cumulative effect on the payload. For example, if a transformation has been configured to modify a vendor and product identifier as well as to remove specific data, then a modified message will be passed to the transformation to have the vendor and product identifier updated, and a modified message with altered vendor and product identifiers will then be passed to data removal transformation.

The modified message resulting from transformation rules 121, will then be further modified by tokenization rules 123a.

In particular, selected payload data may be selected in accordance with the tokenizing rules 123a. For example, personal information (e.g. names, addresses); payment card information; or the like may be extracted from magnetic stripe data, human input, serial bus transfers to mass storage, or similar messages. Once extracted, the data may be forwarded to data vaulting and tokenization server 36, which acts as a token encoder and stores the provided data to security interface 10 in block S172 and returns at least one token used to identify and later retrieve the provided data, now stored at data vaulting and tokenization server 36. Once the token has been received from tokenization server 36, security processor 20 may replace the selected data in the payload with the at least one token, also in block S172, to form modified payload. A modified message comprising the overhead and the payload data may be formed at unit 25 and forwarded to a downstream endpoint—such as computing device 50—in place of the intercepted message, in block S178.

As part of tokenization by security interface 10, sensitive data may be removed from the payload data and replaced with substitute token values. For example an HID data response message may be configured such that if the device is a magnetic stripe reader, and the response message is track data read from a card, and the track type is "2" and the Primary account Number field contains data, that this supplied secure value be removed from the data, and replaced with a substitute token value. As detailed below, the token value may be stored along with the sensitive data it replaces in an alternate data vaulting and tokenization server 36.

Prior to dispatching the modified message, it may be suitably encoded in block S176 so that computing device 50 can receive the modified message and process the request. The format of the original request may or may not match the encoding of the request in block S176 to be sent to computing device 50.

FIGS. 7A-7B depict pseudo code example transformation rules 121 and tokenization rules 123a for requests from peripheral 14. Transformation rules 121 and tokenization rules 123a define a plurality of transformations that may be selectively invoked. For example, as depicted in the configuration example, transformation rules 121 are configured to modify the vendor and product identifier of the peripheral device and to remove the discretionary data field from tracks 1 and 2.

In order to provide modified messages to computing device 50, processor 20 of security interface 10 may initiate and/or response to connections using port 19 to port 19 on computing device 50. The available connections to computing device 50 may be configured as part of the endpoint configuration of port 18, such that they are a continuation of the same service. For example, if security interface 10 is providing services for USB traffic, the connection to computing device 50 may (although not necessarily) also use USB.

Computing device 50 may then receive the modified message on an endpoint connection from port 19. Computing device 50, in turn, may perform processing by software, hardware, drivers or some other means—creating, for example, service 51 (e.g. point of sale software, file explorer or transfer utility).

Service 51 from computing device 50 may or may not return data in a response to the request. The response will now be directed to security interface 10. If the connection between computing device 50 and security interface 10 has not been closed (e.g. timed-out) the response will also be processed by at interface 10 by security processor 20 in accordance with data transformation rules 121 and data tokenization rules 123b to produce a modified response.

In a configuration, any substitute token data in the response may be replaced with either the original sensitive data or additional or alternate data and returned to peripheral 14 or computing device 50.

FIG. 8 depicts pseudo code exemplifying transformations rules 121 and de-tokenization rules 123b used in processing responses from computing device 50 at security interface 10. Again, each of the rules may be selectively applied, in reliance on zero or more processing conditions applied to determine if and when it should be invoked. For example, a transformation rule 121 may be defined to replace a specific file name in a mass storage serial bus request with an alternate value, such as replacing "file1.doc" with "file2.doc".

Again, a plurality of de-tokenizing rules 123b may be applied to the response, and more particularly the payload data of the response. Each of the rules may rely on zero or more processing conditions applied to determine if and when it should be invoked.

For example, as depicted in the example configuration a de-tokenizing rule 123b may cause vaulted data to be saved when the computing device 50 successfully reads the modified message.

Once the response message has been modified, the modified response message may be encoded at interface 10 in block S194, and transmitted to peripheral 14 in block S196. The response will typically be encoded into the format that the associated original request was received from peripheral 14. This need not be the same format as the response received from the computing device 50.

The encoded response may be transmitted via port 18, to peripheral 14, where the process flow completes for the response.

As should now be appreciated, interposition of processor 20 in the connection between peripheral 14 and computing device 50 allows payload data in communications between peripheral 14 to be secured. Sensitive data is stored at data vaulting and tokenization server 36, and replaced in request messages with tokens. Tokens in response data may be replaced with sensitive data retrieved from data vaulting and tokenization server 36, or a proxy therefor (e.g. additional data). In this way, the message exchange between peripheral 14 and computing device 50 over the established connection need not any provide any sensitive data to computing device 50.

For example, a credit card number being submitted from the peripheral 14, via a magnetic card track data over USB could be removed and replaced with a token substitute value 'X', where the computing device 50 would receive the value 'X' in place of the original data. This replacement can be reversed so that in a response received from computing device 50 the substitute token value 'X' can be replaced with the original value, so that an end user at peripheral 14 is again presented with the original credit card number, or proxy therefore such as 'Y'. The process is transparent to both computing peripheral 14 and the computing device 50: neither need be aware of the substitution having taken place.

Processor 20 uses network interface 24 to communicate with data vaulting and tokenization server 36 to, as noted, i) store a plurality of sensitive data elements and additional data and obtain a benign substitute (aka a "token"), or ii) provide in return for a token either the original sensitive data or additional data that can be used depending the parameters used in the call the vault interface. Tokenization, de-tokenizing and vaulting of data are further detailed in FIGS. 10 to 14.

Processor 20 may call data vaulting and tokenization server 36, by way of an application programmer interface (API) passing sensitive data—e.g. a credit card number, customer number, name, expiry date, etc—and additional data. The data vaulting and tokenization server 36 may return a token substitute that may have particular characteristics. For example, data vaulting and tokenization server 36 may generate and return a token that satisfies the Luhn validation checks for a credit card.

As such, security interface 10 may be configured to remove credit card numbers from user input, where the credit card is being supplied to support analytics for customer loyalty, and the original system was designed to store these credit card numbers to apply this analysis.

Figure 11A:
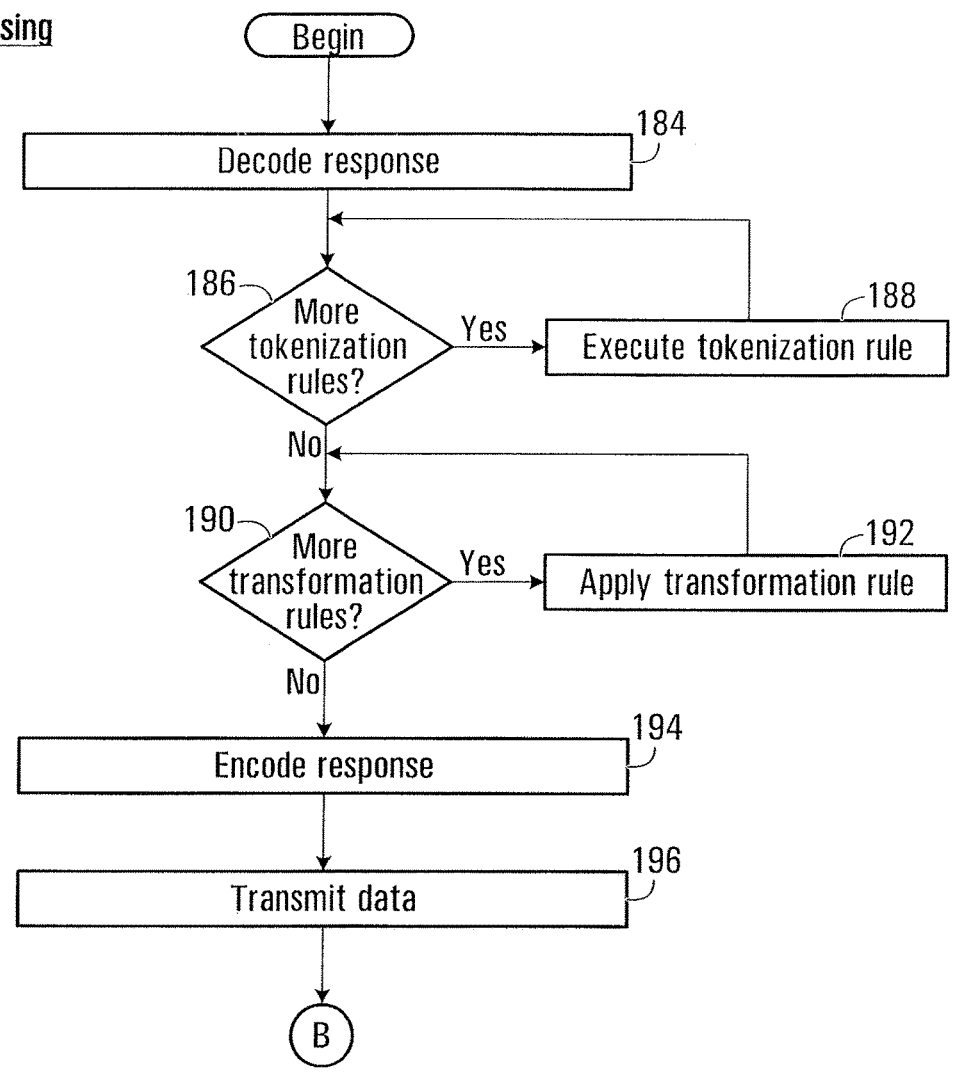
FIGS. 11A-11B are a flow chart of the handling of a response at the security device of FIG. 1.
Figure 11B:
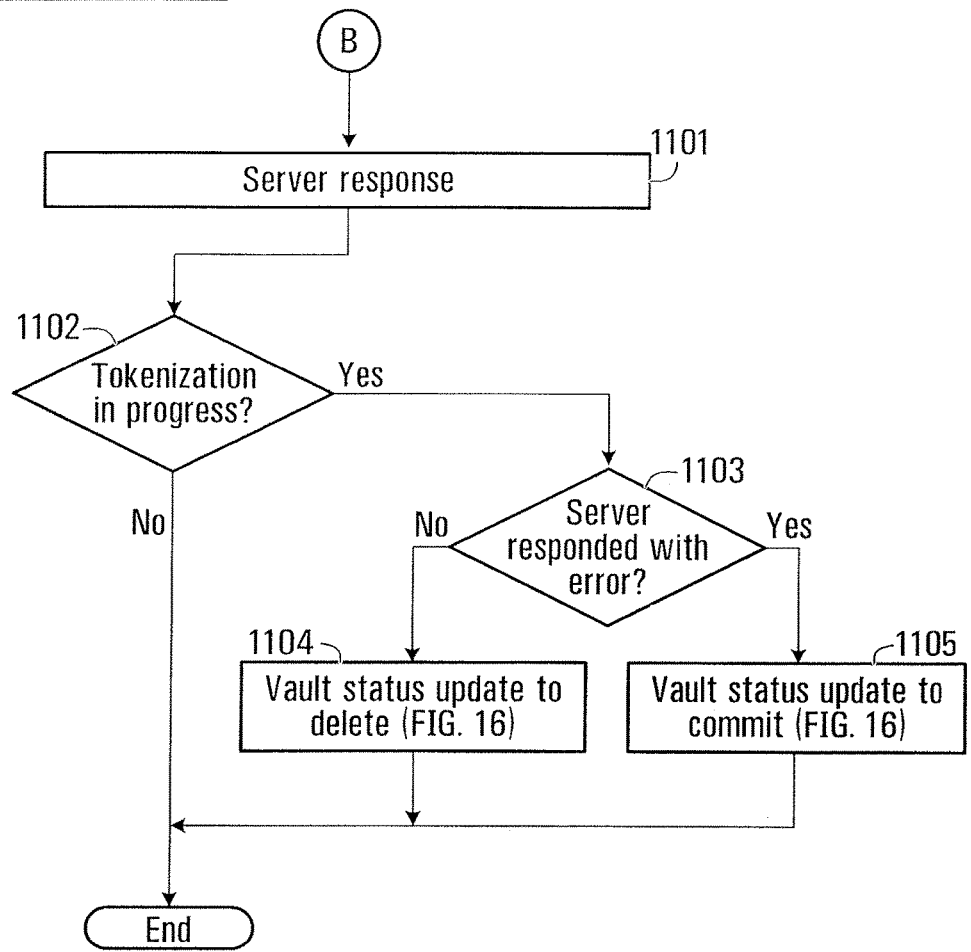

Steps performed at interface 10 in processing a response are further exemplified in FIG. 11A and FIG. 11B.

As illustrated, upon receipt of the response by transport layer component 120, the response is decoded by a data extraction/replacement handler 122 for the interface layer used by the response in block S184. Optionally, the relevant interface layer protocol may be analyzed by block 124. Typically, however, the specific data extraction/replacement handler 122 may be chosen in dependence on the connection which was initially established by peripheral 14. That is, context data associated with the request (and stored at security interface 10) may be retrieved to be used processing the response processing.

Payload data in response PDUs may be received and decoded in S184 as required for transformation and de-tokenization. The payload data received may be some or all of the data in the response. For example, the response is a binary document the response data may be only received in fragments and buffered at security interface 10 as to reduce the memory requirements on the security interface 10.

Decoded data in the response may then be transformed by applicable de-tokenizing rules 123b in blocks S186 and S188, and data transformation rules 121 in blocks S190 and S192.

In particular, selected payload data may be selected in accordance with the de-tokenizing rules 123b. For example, a token within the response payload may be provided to data vaulting and tokenization server 36, in return for data stored at data vaulting and tokenization server 36. The token within the response message may be replaced with the returned data, to form a modified response message. As will become apparent, the returned data may be sensitive data previously extracted from a request, or addition data stored in association with the token.

Figure 12:
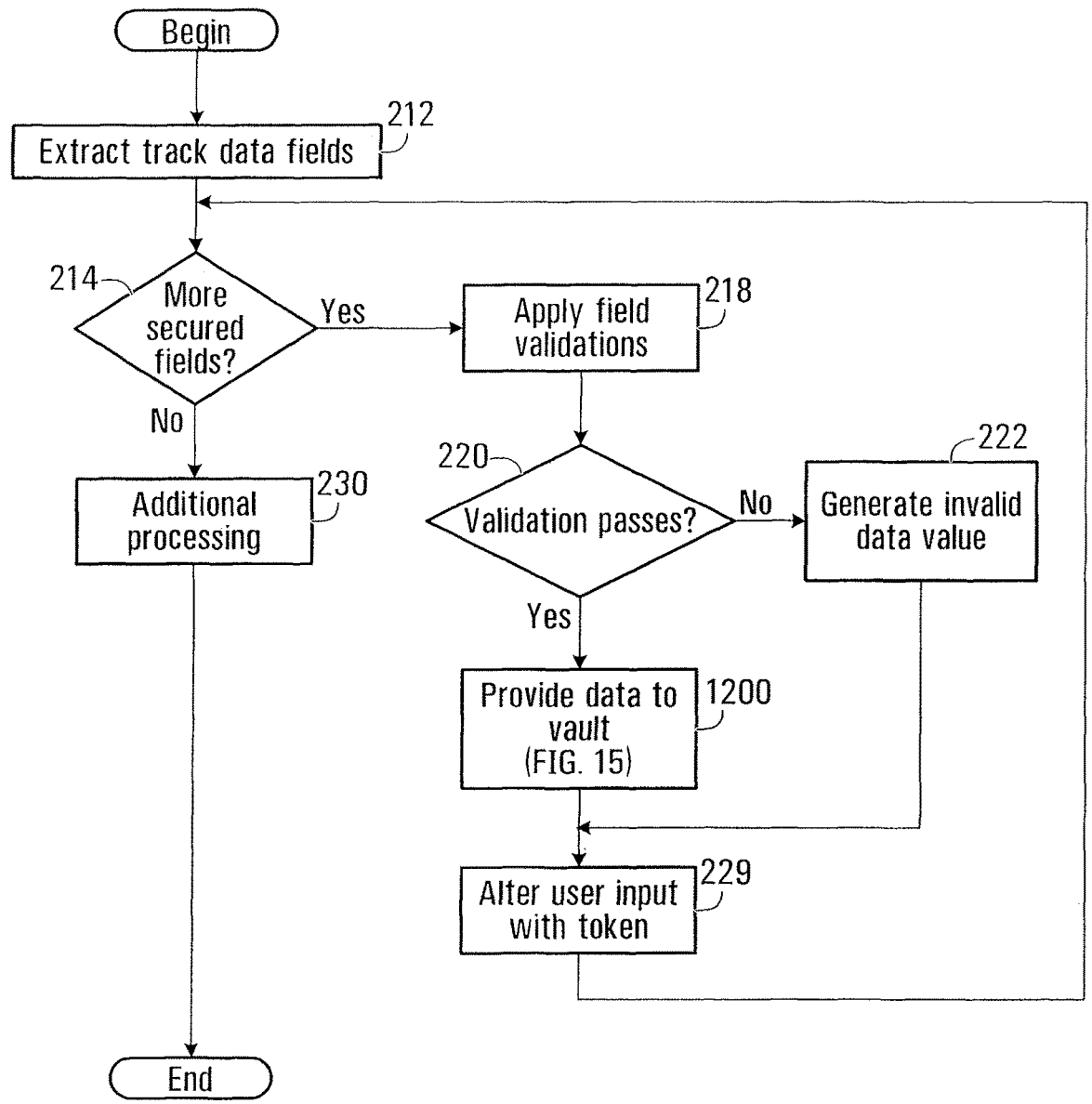
FIG. 12 is a flow chart illustrating tokenization at the security device of FIG. 1.

FIG. 12 depicts steps performed in tokenizing data within a magnetic stripe data track, at security interface 10. Tokenization may be performed in steps S170 and S172 (FIG. 8). As illustrated, the magnetic stripe track data is parsed and analyzed to locate fields to be secured/tokenized in blocks S212 and S214. Each identified field may be validated in block S218 to ensure values meet defined criteria. For example, if the field to be tokenized represents a credit card number, it may be validated by way of a Luhn check, and by validating the first digit as a previously defined and allowed value. If validation passes, as determined in block S220, the value may be passed to vaulting and tokenization server 36 in block S1200. Vaulting and tokenization server 36 may return a token value, and temporarily store the passed value. If validation does not pass an invalid data value may be generated in block S222. The field in the magnetic stripe track data to be tokenized may be modified by interface 10 in block S229, by replacing the value contained in the original document/message with the token value returned by vaulting and tokenization server 36 in block S1200.

Additional processing to the magnetic stripe track data may be performed in block S230.

Upon receipt of a successful processing of a request interface 10 may signal a commit message to vaulting and tokenization server 36. Vaulting and tokenization server 36, in turn, may commit storage of data provided from the message at vaulting and tokenization server 36 for later retrieval, in block S1300. Alternatively, discard message may be provided to vaulting and tokenization server 36, signaling that vaulting and tokenization server 36 should discard temporarily stored values in the message. An example of a successful response may be an interface specific response acknowledging receipt of the request, another example may be the transmission of the request from the endpoint.

Figure 13:
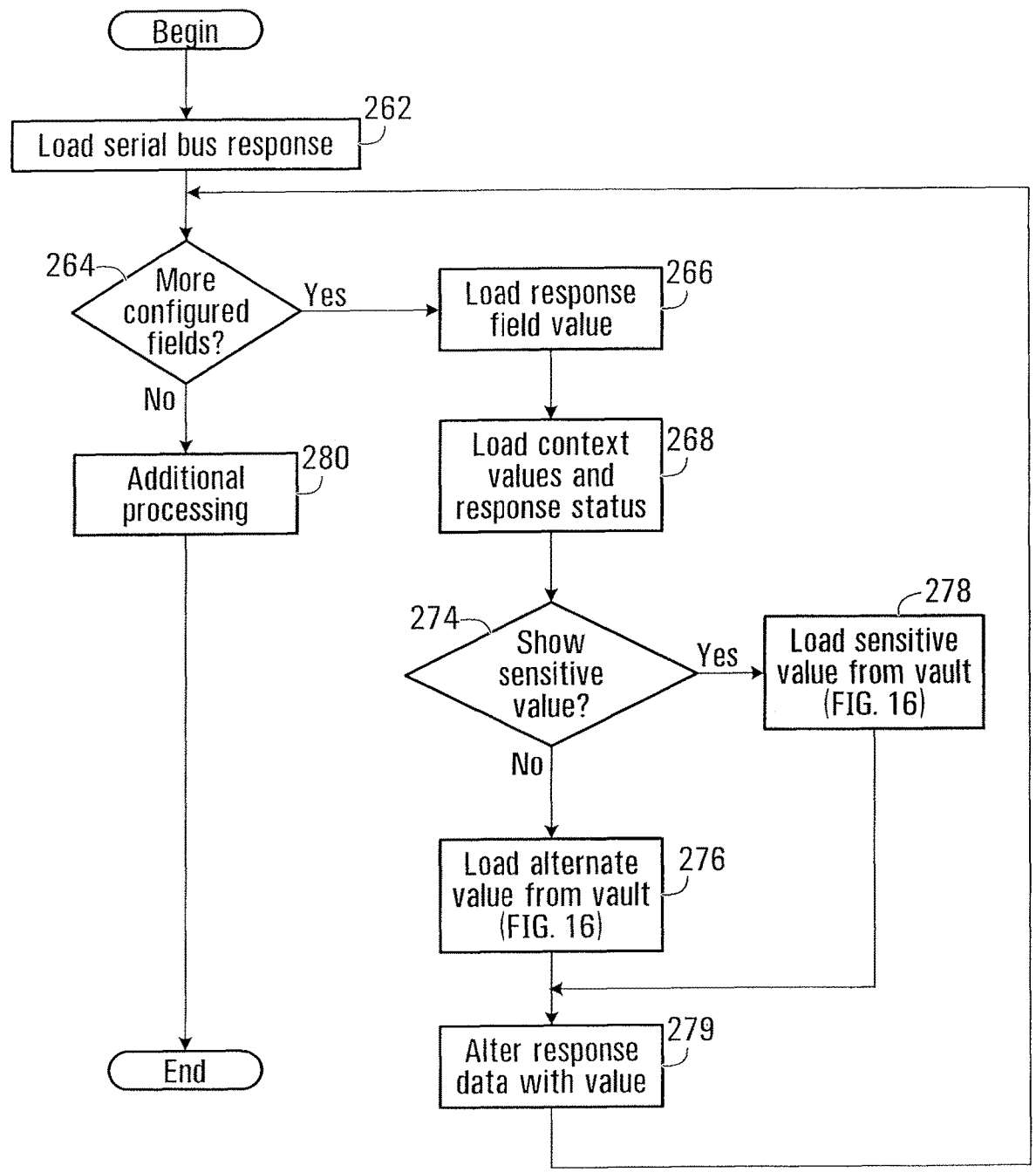
FIG. 13 is a flow chart illustrating tokenization at the security device of FIG. 1.

FIG. 13 depicts steps performed in de-tokenizing data within an Serial Bus request for a binary document, at security interface 10, for example in blocks S186 and S188 of FIG. 11. As illustrated, binary document is loaded in block S262, and may also be parsed to identify tokens contained within the document. Identified tokens (as identified in blocks S264 and S266) may be used to retrieve associated data from vaulting and tokenization server 36 in block S278 or S276. If a token is to be replaced by its sensitive data, the sensitive data will be retrieved in block S278. If, on the other hand, the token is to be replaced by additional data stored by vaulting and tokenization server 36, then this data is retrieved in block S278. The retrieved data is used to replace the token in the binary document in block S279.

Figure 14:
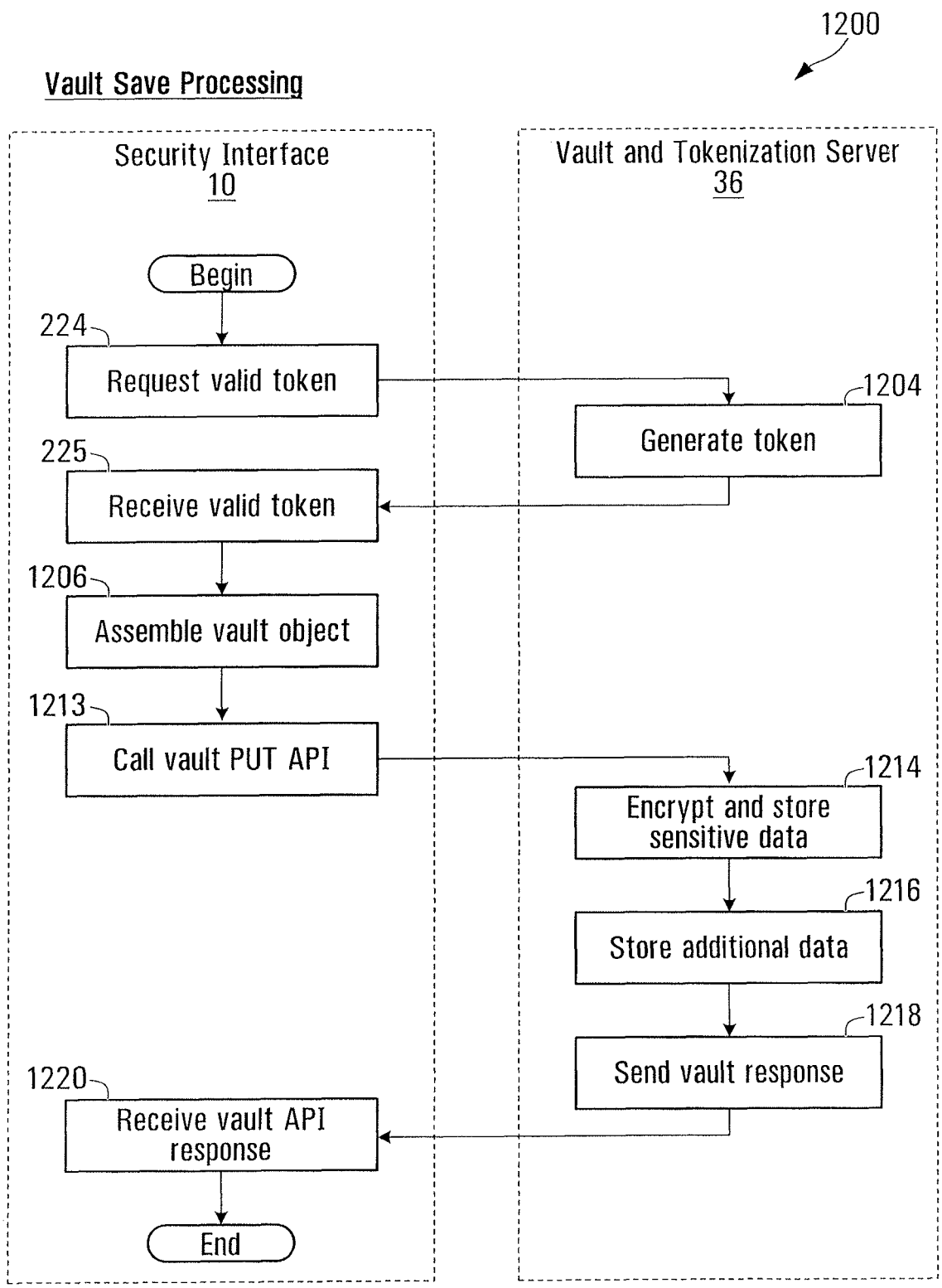
FIGS. 14-16 are flow charts illustrating data vaulting operation between the security device of FIG. 1, and a data vaulting and tokenization server of FIG. 1.

Data may be saved in vaulting and tokenization server 36, as illustrated in FIG. 14. As illustrated, in block S224 interface 10 requests a token in block S224, by providing a suitable message to vaulting and tokenization server 36. Vaulting and tokenization server 36 may respond by providing the token in block S1204, which is received in block S225. In block S1206, data to be stored in association with the token may be assembled for provision to vaulting and tokenization server 36 in block S1213. Data to be stored may, for example, include sensitive data, additional data, and metadata. The provided data may at vaulting and tokenization server 36 in block S1214 and S1216, for storage in a data store at vaulting and tokenization server 36 after optional receipt of a commit message as describe below. It may also optionally be encrypted. In block S1218, vaulting and tokenization server 36 may provide a completion message to interface 10 that is received in block S1220.

Figure 15:
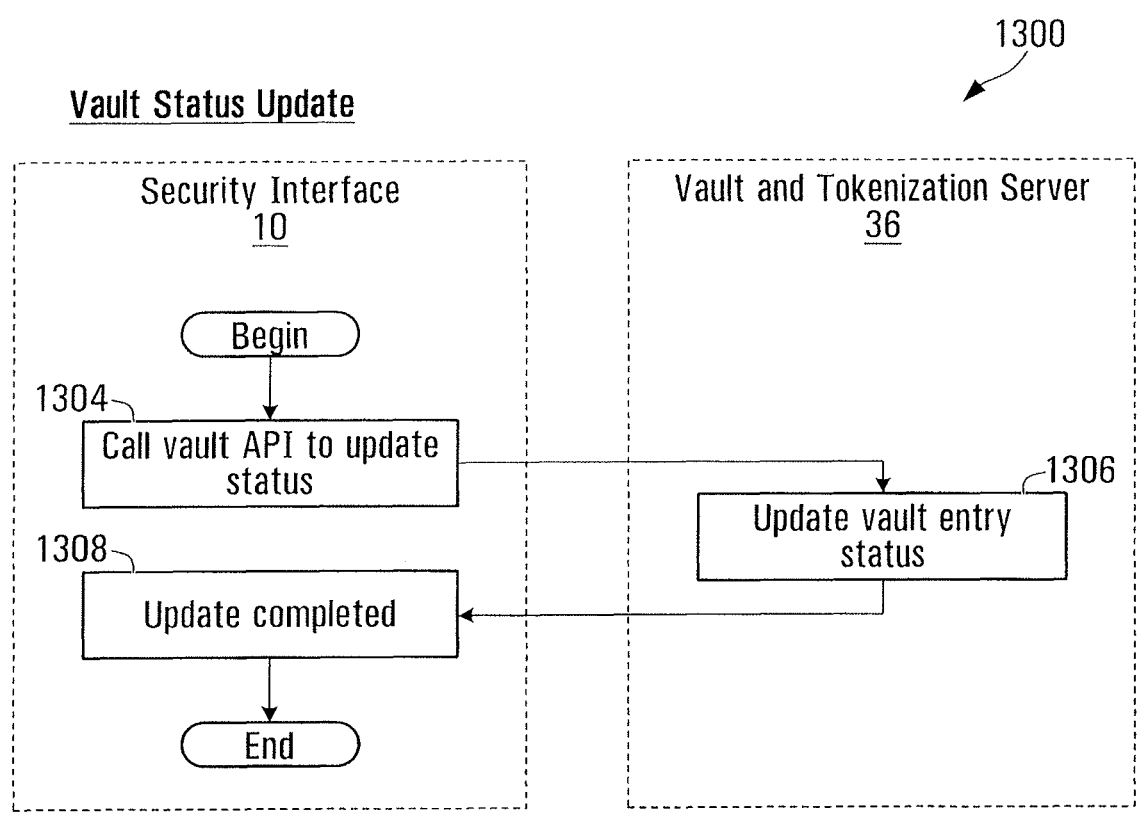
Figure 16:
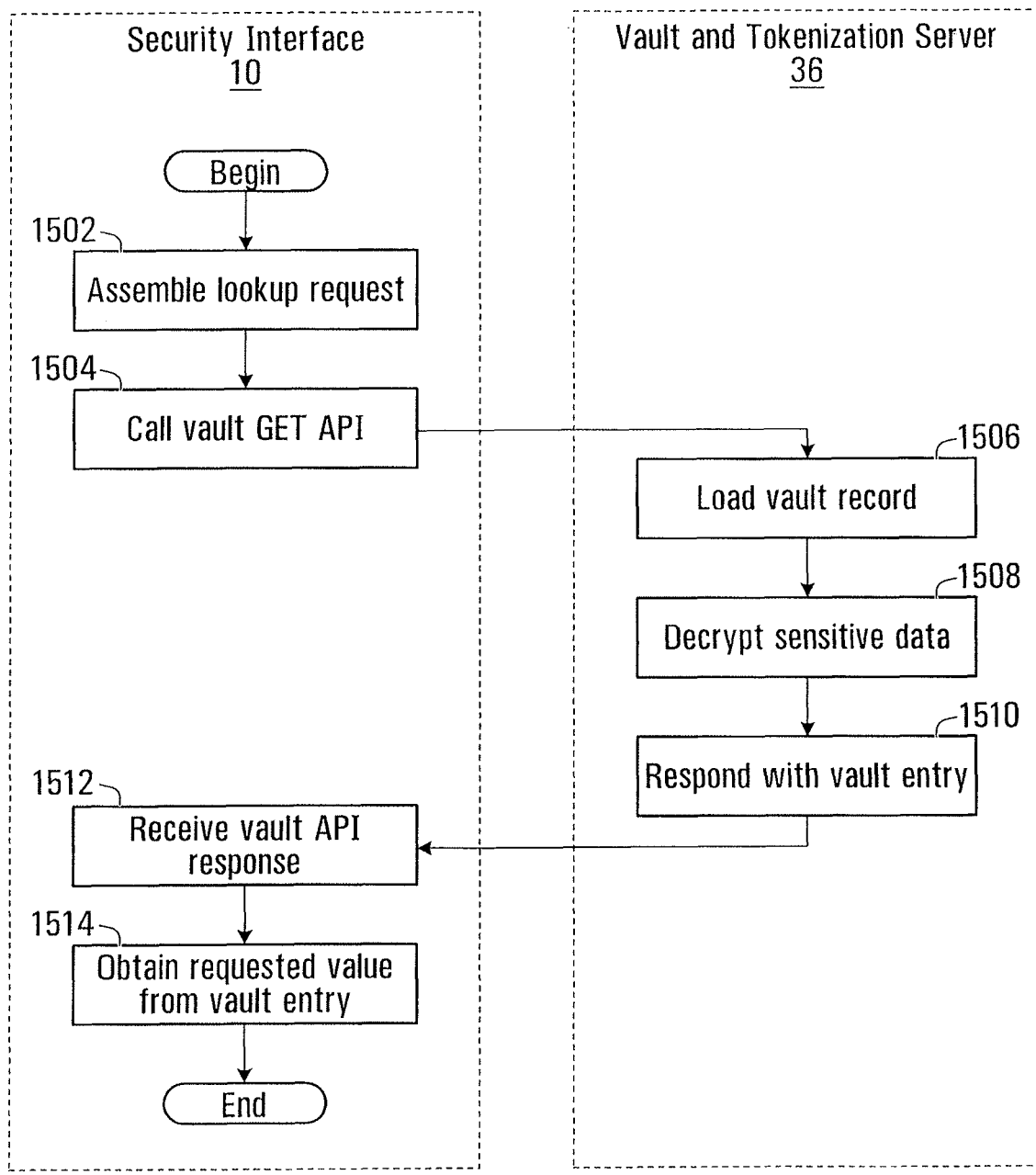

Data commit and delete may be initiated by interface 10 as illustrated in FIG. 15, respectively. As illustrated, data commit or deletion of data previously provided to vaulting and tokenization server may be committed or deleted by tokenization server 36, by identifying the data/token and providing an appropriate message through an API call in block S1304 to vaulting and tokenization server 36. Vaulting and tokenization server 36, in response may commit or delete the token and associated data as identified in block S1306. As a result of the commit, the token and associated data may be persistently stored in a database at vaulting and tokenization server 36, for later retrieval and use. Likewise, as a result of a delete message, the token and associated data may be deleted from the data store at vaulting and tokenization server 36. Commit/delete may be acknowledged to security interface 10 by vaulting and tokenization server 36. Acknowledgement may be received by security interface 10 in block S1308.

Data may be retrieved from vaulting and tokenization server 36 by security interface 10, as illustrated in FIG. 14. As illustrated, in block S1502 an identified token may be extracted from payload data. The token in a suitable message may be provided to vaulting and tokenization server 36 in block S1504, by way of an API call. Vaulting and tokenization server 36 may respond by providing the associated data in block S1510, after optional decryption in block S1508. The data may be received at interface 10 in block S1512, where desired data may be parsed in block S1514, and substituted for the provided token in the document.

Conveniently, interface 10 allows system administrators to remove sensitive data from computing device 50, without any changes having been made to computing device 50, regardless of the location of computing device 50. Removal and replacement of sensitive data takes place at the outer most edges of the existing system boundaries, as close to the users and/or back end processes (i.e. payment card processes). Removal and further storage of sensitive data takes place in an alternate and specifically designed and vaulting and tokenization server 36. Configuration and subsequent install of interface 10 may be simple and fast, and allows administrators to quickly and easily adhere with regulatory and best practices for security of data with little risk or cost. The removal or replacement of sensitive data at the connection between a peripheral 14 and the computing device 50 may be desirable in cases where computing device 50 may be compromised, and data received at interfaces and/or in memory may be accessed by malicious processes to access sensitive data. For example, a point of sale terminal may be compromised by malware, allowing said malware to memory directly to access payment cards as they are processed from a card reader.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A security device for securing a peripheral link between a computing device and a peripheral, said security device comprising:
   a network interface communicatively coupling said security device to a computing network;
   a peripheral port for attaching said peripheral to said security device by way of a peripheral bus;
   a host port for attaching said security device to a peripheral port of said computing device; and
   processing logic interconnecting said peripheral port, said host port, and said network interface, said processing logic operable to
   query an identifier of said peripheral by way of said peripheral port of said security device;
   configure said peripheral port of said security device to allow communication between said security device and said peripheral;

configure said host port so that said security device is presented as said peripheral to said computing device at said peripheral port of said computing device;

establish a host to security device link, over said host port to transfer data otherwise transferred to and from said host by said peripheral link;

establish a peripheral to security device link, over said peripheral port of said security device to transfer data otherwise transferred to and from said peripheral by said peripheral link;

establish a network communication channel from said processing logic of said security device over said network to a remote data store, using said network interface;

intercept data destined for transfer between said computing device and said peripheral at said security device over said host to security device link; and identify selected portions of said data intercepted by said security device to secure data transmitted to and from said peripheral;

replace said selected portions of said data in order to obfuscate said selected portions of said data, as transferred between said computing device and said peripheral;

transfer said selected portions of said data by way of said network communication channel for storage at said remote data store, remote from said peripheral.

2. The security device of claim 1, wherein said processing logic is further operable to:

replace said selected portions of said data with at least one token, said at least one token sufficient to uniquely identify said selected data.

3. The security device of claim 2, wherein said processing logic is further operable to:

provide said selected data to a tokenizing server by way of said computing network, and receive in return therefor said at least one token.

4. The security device of claim 1, wherein said peripheral port of said security device and said host port are each a universal serial bus (USB) port.

5. The security device of claim 1, wherein said selected portions of data are pre-identified types of data to be transferred between said computing device and said peripheral.

6. The security device of claim 5, wherein said pre-identified types of data comprises personally identifiable information, and wherein said personally identifiable information is one of health data or payment card data.

7. The security device of claim 4, wherein said data is transferred between said peripheral and said computing device as USB Human Interface Device class messages.

8. The security device of claim 3, wherein said at least one token comprises a numeric token that satisfies the Luhn formula.

9. A method of operating a security device for securing a peripheral link between a computing device and a peripheral, said computing device and said peripheral configured for direct interconnection with each other by way of said peripheral link, said security device comprising a network interface for communication with a communications network, said method comprising:

interposing said security device on said peripheral link, between said computing device and said peripheral;

establishing a communication channel by way of said network interface to a remote data store;

querying an identifier of said peripheral by way of a peripheral port of said security device;

configuring said peripheral port of said security device to allow communication between said security device and said peripheral;

configuring a host port of said security device so that said security device is presented as said peripheral to said computing device at a peripheral port of said computing device;

intercepting data transferred between said computing device and said peripheral at said security device; and identifying selected portions of said data intercepted by said security device to be securely transmitted to and from said peripheral;

replacing said selected portions of said data in order to obfuscate said selected portions of said data;

transferring said selected portions of said data by way of said communication channel from said security device for storage at said remote data store.

10. The method of claim 9, further comprising, at said security device:

receiving from said peripheral a plurality of data units carrying data in a message encoded in accordance with an interface layer protocol, said message comprising a payload;

extracting selected data from said payload, in accordance with one or more tokenizing rules;

forwarding said selected data to a token encoder, to allow said token encoder to store said selected data and return at least one token used to identify said selected data;

receiving from said token encoder, at least one token;

replacing said selected data in said payload with said at least one token to form a modified payload;

forming a modified message comprising said payload data;

forwarding said modified message to said host device, in place of said message.

11. The method of claim 9, wherein said intercepting of data comprises intercepting a request message to be exchanged between said peripheral and said computing device, said request message comprising request payload data; and wherein said obfuscating comprises applying tokenization rules to said request payload data to extract sensitive data from said request message and forward said sensitive data to a token encoder, to allow said token encoder to store said sensitive data and return at least one token used to identify said sensitive data;

receiving from said token encoder said at least one token;

replacing said sensitive data in said payload of said request message with said at least one token to form modified payload;

forming a modified message comprising said payload as modified;

providing said modified request message to said computing device;

and further comprising:

receiving from said computing device a response message, said response message comprising response payload data;

applying de-tokenization rules to payload data of said response message to identify at least one token within said response message;

retrieving from said token encoder data stored in association with said at least one token in said response message;

replacing said at least one token in said response payload data with said data as retrieved;

forming a modified response message comprising said response message payload as modified;

providing said modified response message to said peripheral device.

12. The method of claim 11, wherein said request message and response message are USB HID (Human Interface Device) class messages.

13. The method of claim 11, further comprising forwarding additional data associated with said sensitive data to said token encoder for storage.

14. The method of claim 13, wherein said additional data comprises a partially obfuscated version of said sensitive data.

15. The method of claim 11, wherein said sensitive data comprises a credit card number.

16. The method of claim 11, wherein said token is a numeric token that satisfies the Luhn formula.

17. A non-transitory computer readable storage medium storing instructions that, when executed, adapt a security device comprising a peripheral port, a host port, and a network interface, to perform steps comprising:

querying an identifier of a peripheral by way of said peripheral port, wherein said security device is interposed between a computing device and said peripheral;

configuring said peripheral port of said security device to allow communication between said security device and said peripheral;

configuring a host port of said security device so that said security device is presented as said peripheral to said computing device at a peripheral port of said computing device;

intercepting data transferred between said computing device and said peripheral at said security device; and identifying selected portions of said data intercepted by said security device to secure data transmitted to and from said peripheral replacing said selected portions of said data in order to obfuscate said selected portions of said data;

transferring said selected portions of said data by way of said network interface from said security device for remote storage at a data store.

18. The non-transitory computer readable storage medium of claim 17, wherein said intercepting of data comprises
intercepting a request message to be exchanged between said peripheral and said computing device, said request message comprising request payload data; and wherein said obfuscating comprises
applying tokenization rules to said request payload data to extract sensitive data from said request message and forward said sensitive data to a token encoder, to allow said token encoder to store said sensitive data and return at least one token used to identify said sensitive data;

receiving from said token encoder said at least one token;

replacing said sensitive data in said payload of said request message with said at least one token to form modified payload;

forming a modified message comprising said payload as modified;

providing said modified request message to said computing device;

and storing further instructions that, when executed, adapt said computer to perform steps comprising:

receiving from said computing device a response message, said response message comprising response payload data;

applying de-tokenization rules to payload data of said response message to identify at least one token within said response message;

retrieving from said token encoder data stored in association with said at least one token in said response message;

replacing said at least one token in said response payload data with said data as retrieved;

forming a modified response message comprising said response message payload as modified;

providing said modified response message to said peripheral device.

19. The non-transitory computer readable storage medium of claim 17, storing further instructions that, when executed, adapt said computer to perform steps comprising:

at said security device:
receiving from said peripheral a plurality of data units carrying data in a message encoded in accordance with an interface layer protocol, said message comprising a payload;

extracting selected data from said payload, in accordance with one or more tokenizing rules;

forwarding said selected data to a token encoder, to allow said token encoder to store said selected data and return at least one token used to identify said selected data;

receiving from said token encoder, at least one token;

replacing said selected data in said payload with said at least one token to form a modified payload;

forming a modified message comprising said payload data;

forwarding said modified message to said host device, in place of said message.

* * * * *